No. 707,930. Patented Aug. 26, 1902.
H. KIRSCHNING.
PACKING RING.
(Application filed Mar. 7, 1902.)
(No Model.)
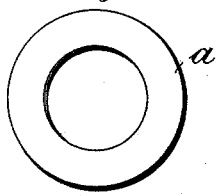
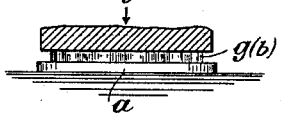
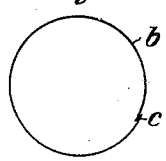
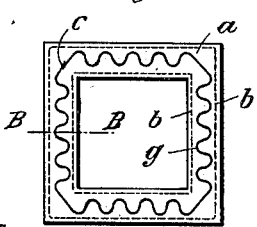
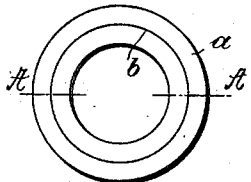
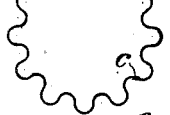
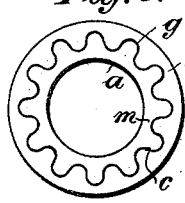
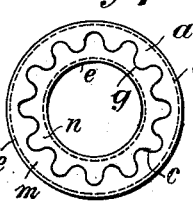
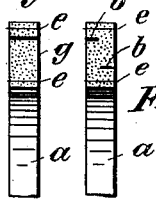
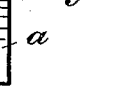
WITNESSES:
W. M. Avery
C. R. Ferguson
INVENTOR
Hermann Kirschning
BY
ATTORNEYS
THE NORRIS PETERS CO., PHOTO-LITHO., WASHINGTON, D. C.

UNITED STATES PATENT OFFICE.

HERMANN KIRSCHNING, OF BERLIN, GERMANY.

PACKING-RING.

SPECIFICATION forming part of Letters Patent No. 707,930, dated August 26, 1902.

Application filed March 7, 1902. Serial No. 97,094. (No model.)

*To all whom it may concern:*

Be it known that I, HERMANN KIRSCHNING, manufacturer, of 133 Ackerstrasse, Berlin, in the German Empire, have invented certain new and useful Improvements in Packing-Rings, of which the following is a full, clear, and exact description, reference being had to the accompanying drawings, forming part of this specification, in which—

Figure 1 is a plan view of the plain packing-ring. Fig. 2 is a plan view of the annular metal insertion-strip. Fig. 3 is a plan view of the packing-ring with the annular strip inserted into same. Fig. 4 is a sectional view on the line A A, Fig. 3. Fig. 5 shows a modification of the metal insertion-strip. Fig. 6 is a plan view of an improved packing-ring with the annular strip extending throughout the entire thickness of the ring. Fig. 7 shows the new packing-ring provided with rows of stitches on the edges. Fig. 8 is a sectional view of the same, drawn on a larger scale. Fig. 9 is a sectional view of a similar packing-ring provided with two insertion-strips. Fig. 10 shows the method of inserting a strip into a ring. Fig. 11 is a plan view of a rectangular packing provided with several strips. Figs. 12 and 13 are sectional views of the same on the line B B, Fig. 11; and Figs. 14 and 15 show two further modifications of the new packing-ring.

Similar letters of reference indicate corresponding parts in all the views.

The object of my invention is to construct an improved packing-ring in the manufacture of which one or more sheet-metal strips are pressed edge foremost into the ring. The packing-ring may be manufactured of asbestos-board, ordinary pasteboard, or other similar material by stamping or cutting. The insertion-strips of metal above referred to may extend either wholly or only partially through the thickness of the ring, as desired. By means of the insertion of the metal strip or strips an efficient and reliable packing is obtained. In addition to this the strength and stiffness of the packing-ring are greatly increased, so that such rings may be subjected to great strains without danger of fracture or bending. As compared with packing-rings having metal insertions as hitherto made, my improved form of packing is far easier of manufacture. Owing to the fact that ordinary asbestos-board may be employed in the manufacture of these rings they are much more economical than asbestos packing as hitherto used.

According to one form of my invention the packing-ring $a$ is cut or stamped from asbestos or ordinary paste board or other suitable material. The annular metal insertion-strip $b$, which is to be inserted edgewise in this ring $a$, may be of zinc, copper, or other suitable metal. It may be placed upon the packing-ring $a$ and pressed into the latter, Fig. 10, and this insertion may extend throughout the entire thickness of the ring $a$, Fig. 3, in which case the strip $b$ is of course as high as the ring is thick. The two extremities $c$ of the metal strip $b$ may be soldered, riveted, or otherwise connected together. By this means deformation of the strip $b$ is prevented while it is being inserted into the ring $a$. The insertion-strip may, if desired, be corrugated, Fig. 5, said corrugations being imparted to the strip $g$ by passing it between toothed wheels, fluted rollers, or the like. This corrugated formation of the insertion-strip $g$ gives increased strength to the packing-ring $a$ and also facilitates the insertion of the strip in an exactly vertical direction and obviates any tendency to deformation of the strip $g$.

In another form of my invention rows $e$ of stitching are provided. These stitches may be formed either before or after the insertion of the metal strip or strips. The object of this stitching $e$ is to increase the strength of the ring at its inner and outer edges $m\ n$, and so prevent any breaking or tearing at these points. This sewing of the ring $a$ in the manner above described is especially advantageous when the said ring is built up of a number of superposed layers. The stitches $e$ then prevent any forcible displacement of these separate layers when the metal strip $b$ or $g$ is being inserted. I may, if desired, provide two insertion-strips $b$, Fig. 9, the height of which is less than the thickness of the ring, so that these strips $b$ only penetrate a certain distance when pressed into the packing-ring $a$.

My invention is also applicable to rectangular packings, Fig. 11—such as is employed in the valve-chests of steam-engines, for example.

In another form of my invention I provide two plain insertion-strips $b$ and between these a corrugated strip $g$, none of these insertion-strips entirely penetrating the ring, Fig. 12, or the two plain strips are arranged so that they do not pass quite through the packing-ring; but the middle strip extends throughout its entire width, Fig. 13. Obviously numberless variations of this kind may be made. These packing-rings may also be provided with holes $i$ for the passage of flange-bolts. In this case both the central opening $h$ of the ring and also the bolt-holes may be surrounded by metal strips $b$ and $g$. Said openings may be surrounded by a separate strip, or the various holes may all be surrounded by a single insertion-strip $g'$, Fig. 15. The form and material of the sheet-metal insertion-strips $b$ $g$ may be varied as desired. Instead of being inserted vertically in the ring they may be pressed in obliquely. The essential point is that one or more sheet-metal strips $b$ $g$ is or are forced edgewise into the packing-ring $a$, these insertion-strips extending either wholly or only partially through the thickness of the ring $a$.

Having thus described my invention, I claim as new and desire to secure by Letters Patent—

1. The combination, substantially as and for the purpose set forth, of a packing-ring cut or stamped from asbestos or ordinary paste board or other suitable material, and flat strips of copper, zinc or other suitable metal to be inserted edgewise in this ring, the width of the strip being in the direction of the axis of the ring.

2. The combination, substantially as and for the purpose set forth, of a packing-ring cut or stamped from asbestos or ordinary paste board or other suitable material, and edgewise-inserted strips of copper, zinc or other material, this insertion extending throughout the entire thickness of the ring and all parts of the opposite edges being parallel with the opposite surfaces of the ring.

3. The combination, substantially as and for the purpose set forth, of a packing-ring cut or stamped from asbestos or ordinary paste board or other suitable material, and flat edgewise-inserted strips having corrugations.

4. The combination substantially as and for the purpose set forth, of a packing-ring provided with holes for the passage of flange-bolts, and edgewise-inserted strip, the central opening of the ring and also the bolt-holes being surrounded by the strip.

In witness whereof I have hereunto signed my name, this 24th day of February, 1902, in the presence of two subscribing witnesses.

HERMANN KIRSCHNING.

Witnesses:
HENRY HASPER,
WOLDEMAR HAUPT.